(12) United States Patent
Hughey et al.

(10) Patent No.: US 11,075,509 B2
(45) Date of Patent: Jul. 27, 2021

(54) 2-SHOT MOLDED VAPOR SEAL

(71) Applicant: ALLIED MOULDED PRODUCTS, INC., Bryan, OH (US)

(72) Inventors: Steven Hughey, Bryan, OH (US); Zackery Walk, Antwerp, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 0 days.

(21) Appl. No.: 16/729,975

(22) Filed: Dec. 30, 2019

(65) Prior Publication Data
US 2020/0220341 A1  Jul. 9, 2020

Related U.S. Application Data

(60) Provisional application No. 62/788,178, filed on Jan. 4, 2019.

(51) Int. Cl.
*H02G 3/12* (2006.01)
*H02G 3/08* (2006.01)

(52) U.S. Cl.
CPC ............... *H02G 3/081* (2013.01); *H02G 3/12* (2013.01)

(58) Field of Classification Search
CPC .................................. H02G 3/081; H02G 3/12
USPC ......................................................... 174/500
See application file for complete search history.

(56) References Cited

U.S. PATENT DOCUMENTS

| | | | | |
|---|---|---|---|---|
| 4,296,870 A | * | 10/1981 | Balkwill | H02G 3/126 174/57 |
| 4,673,097 A | * | 6/1987 | Schuldt | H02G 3/125 220/3.2 |
| 6,908,003 B2 | * | 6/2005 | Feyes | H02G 3/088 174/53 |
| 7,674,974 B1 | * | 3/2010 | Shotey | H02G 3/123 174/53 |
| 9,018,524 B2 | * | 4/2015 | Dinh | H05K 5/06 174/50.54 |
| 9,893,503 B2 | * | 2/2018 | Geno | H02G 3/086 |
| 2004/0182857 A1 | * | 9/2004 | Feyes | H02G 3/121 220/3.2 |
| 2009/0139742 A1 | * | 6/2009 | Bhosale | H02G 3/14 174/58 |
| 2013/0264088 A1 | * | 10/2013 | Dinh | H02G 3/088 174/50.54 |
| 2017/0338635 A1 | * | 11/2017 | Stahl, II | H05K 3/38 |

* cited by examiner

*Primary Examiner* — Timothy J Thompson
*Assistant Examiner* — Michael F McAllister
(74) *Attorney, Agent, or Firm* — Shumaker, Loop & Kendrick, LLP; James D. Miller

(57) ABSTRACT

An electrical box including a flange produced utilizing a 2-shot molding process and provided as a unitary structure. The flange has a first surface and a second surface, wherein the first surface and the second surface are substantially co-planar, spaced apart, and generally parallel to a plane defined by an open end of the electrical box when the electrical box is installed into a corresponding wall structure. The flange is self-supporting and flexible to accommodate dimensional and alignment irregularities in a mounting surface. Each of a plurality of knock outs formed in the electrical box has a slit formed therein that retains passed-through cables, as well as closes and returns to an original undisturbed position when the cables are removed to maintain substantially air tight conditions.

20 Claims, 5 Drawing Sheets

2-SHOT MOLDED VAPOR SEAL

CROSS-REFERENCE TO RELATED PATENT APPLICATIONS

The present disclosure is a United States Utility patent application which claims the benefit of U.S. Provisional Patent Application Ser. No. 62/788,178 filed Jan. 4, 2019, hereby incorporated herein by reference in its entirety.

FIELD

The present invention relates to electrical boxes such as currently used for mounting electrical devices in walls, floors and ceilings, and more particularly to a vapor seal feature for an electrical box.

BACKGROUND OF THE INVENTION

Electrical boxes have long been required by the National Electrical Code to be used in building construction for enclosing electrical apparatus such as switches, sockets and electrical appliance connections, for example. An electrical box is generally secured to a stud or a joist in a wall, a ceiling, or a floor construction with an open end or face, opening towards an interior of a building, room, or other structure.

Whenever the electrical box is utilized, a vapor barrier provided in a wall to prevent outside air from entering into a building is penetrated by the electrical box.

One vapor barrier that is utilized in external walls and ceilings of the building is a continuous plastic sheet, either between the studs and siding, or between the studs and a wall board. The plastic sheet forms the vapor barrier preventing air from leaking into, or out of the building. However, the electrical box requires the penetration of the vapor seal in order to install the electrical box.

One electrical box utilizes a rigid flange surrounding the electrical box to extend outwardly from the box in all directions and includes a first surface and a second surface that are generally parallel with a surface of the wall to abut the vapor barrier. The rigid flange has typically not been provided on metal boxes or boxes produced from other materials. However, others have provided a molded PVC box having the rigid flange integrally molded with the sides and closed end of the electrical box.

Inasmuch as the walls and the sides of the electrical box are required to be substantially rigid, any integrally molded flange has the same rigidity as the sides of the box. The rigidity of the flange creates several issues for installers of the box. Imperfections in the studs and other components of the wall require accommodation of differences in tolerance measurements and alignment. While a flexible vapor barrier easily accommodates the imperfections, the rigid flange extending outwardly from the electrical box does not. Thus, the rigid flange may cause ripples or other imperfections in the wall and the exterior siding. To alleviate the ripples, shaving or adjusting a position of the studs is required to maintain a desired appearance of both the siding and interior surfaces of the walls.

In U.S. Pat. No. 6,908,003, an electrical box having a flexible flange with a first planar surface and second planar surface generally parallel to the closed end of the box is disclosed. However, the flexible flange is difficult to install and seal exterior wall vapor barriers and adherence of the flange to the electrical box is difficult and labor intensive, thus resulting in an increase in cost of producing the electrical box.

Thus, it is highly desirable to provide a new and improved electrical box that allows the electrical box to be installed in a wall construction while maintaining an integrity of the vapor barrier of the wall construction, that can provide a seal with the vapor barrier of the exterior wall or ceiling, to maintain the integrity of the vapor barrier. It is also desirable to provide a new and improved electrical box that can be mounted in a manner to accommodate inconsistencies in dimensions, alignment, and the like, allowing for fast and efficient construction and maintain planar interior wall surfaces and desired siding construction.

SUMMARY OF THE INVENTION

In concordance and agreement with the present invention, an electrical box assembly having an angled, flexible flange with a first planar surface and a second planar surface generally parallel to the closed end of the box, has surprisingly been discovered.

According to an embodiment of the invention, an electrical box assembly comprises a box structure including a closed end, an oppositely arranged open end, and an interior surrounded by at least one sidewall connecting the open end to the closed end. A flange extends outwardly from an outer surface of the at least one sidewall at a position intermediate the open end and the closed end of the box structure. The flange is formed from a resiliently flexible material. The electrical box assembly comprises: a box structure having a closed end and an open end with an interior surface surrounded by a side wall, and a flange disposed intermediate the open end and the closed end of the box and extending laterally outwardly from the side wall, the flange produced as a result of a 2-shot molding process that covers a plurality of knock outs as part of a single piece.

A method of manufacturing an electrical box assembly is also disclosed. The method includes a step of molding a box structure in a first shot of a molding process, the box structure including a closed end, an oppositely arranged open end, and an interior surrounded by at least one sidewall connecting the open end to the closed end. The method further includes a step of molding a flange onto the box structure in a second shot of the molding process with the flange extending outwardly from an outer surface of the at least one sidewall at a position intermediate the open end and the closed end of the box structure.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein.

DETAILED DESCRIPTION OF THE PREFERRED EMBODIMENT

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

Figure 1:
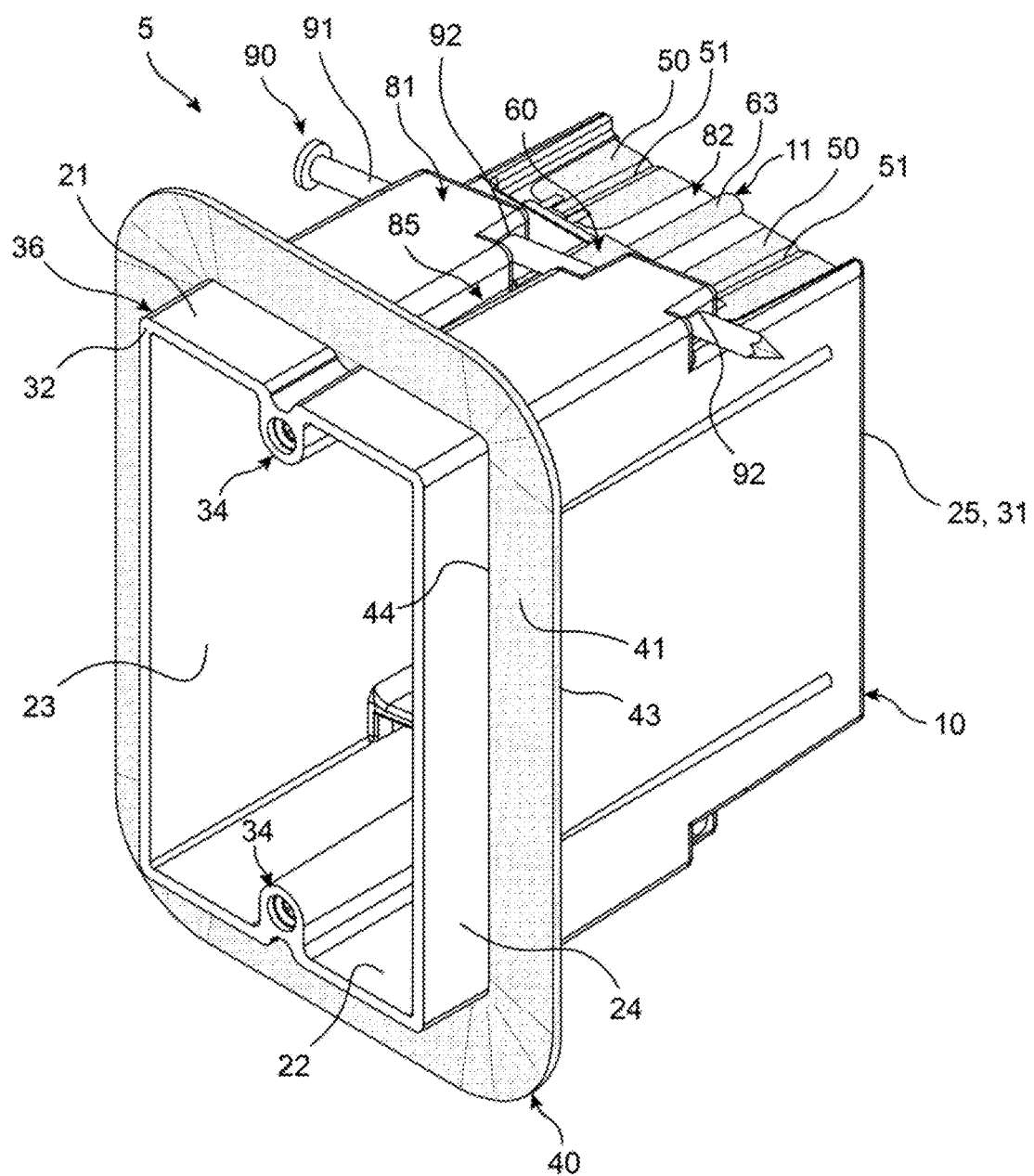
FIG. 1 is a perspective view of an electrical box assembly including an electrical box and a molding applied to the electrical box according to an embodiment of the present invention.
Figure 2:
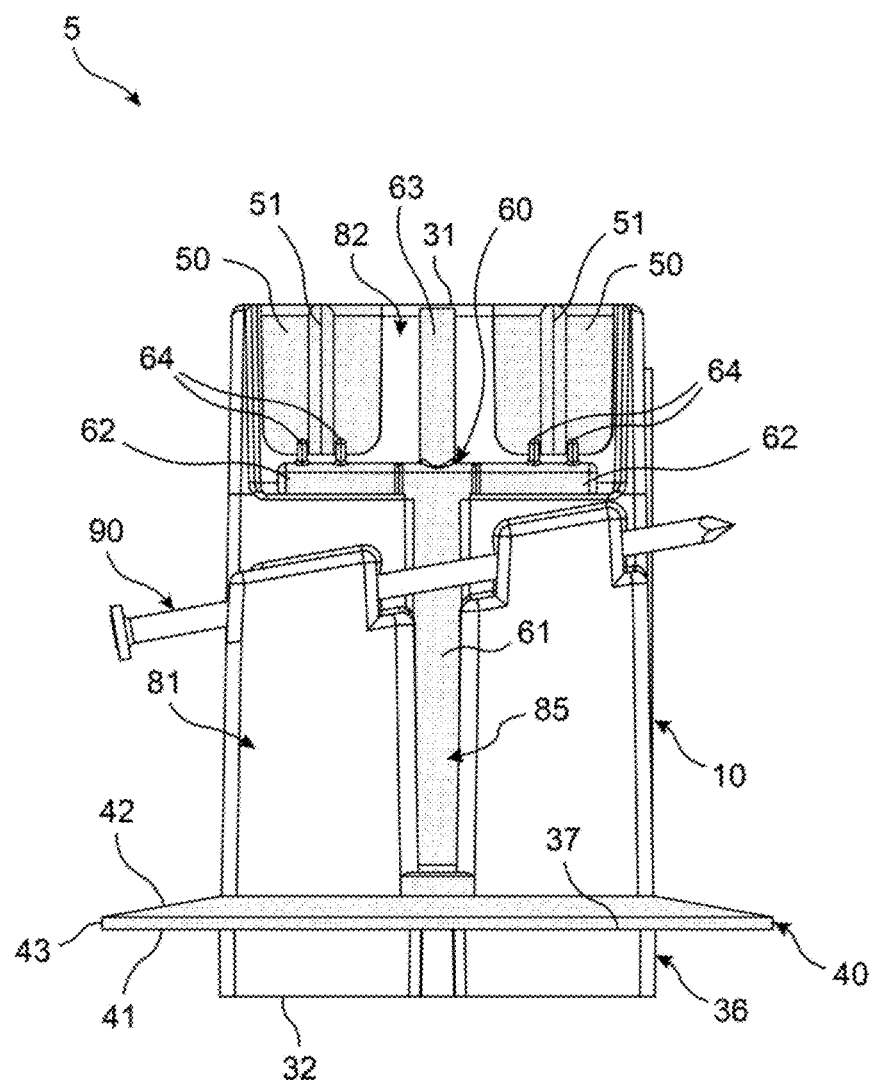
FIG. 2 is a top plan view of the electrical box assembly of FIG. 1.
Figure 3:
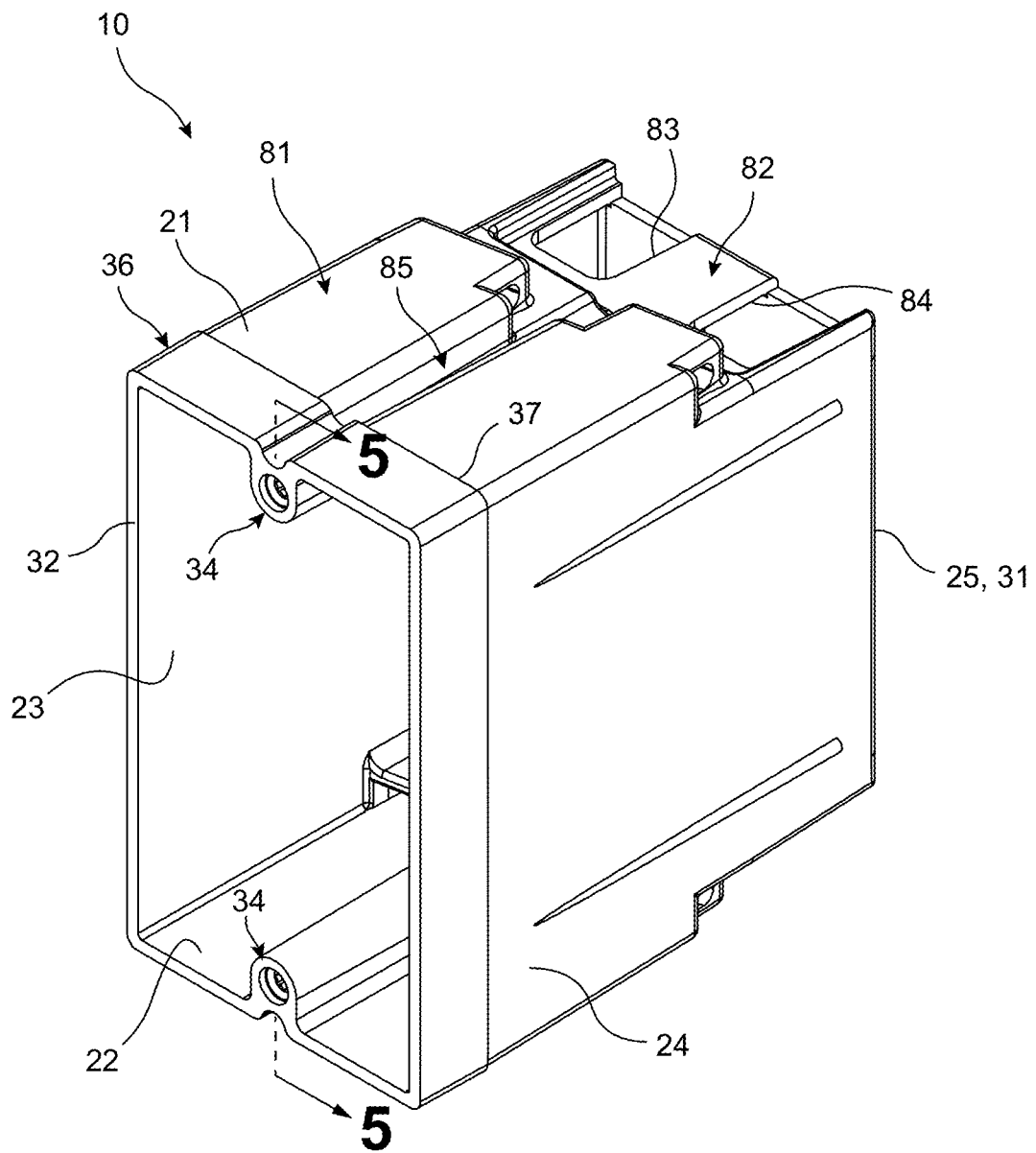
FIG. 3 is a perspective view showing the electrical box of the electrical box assembly prior to the formation of the molding.
Figure 5:
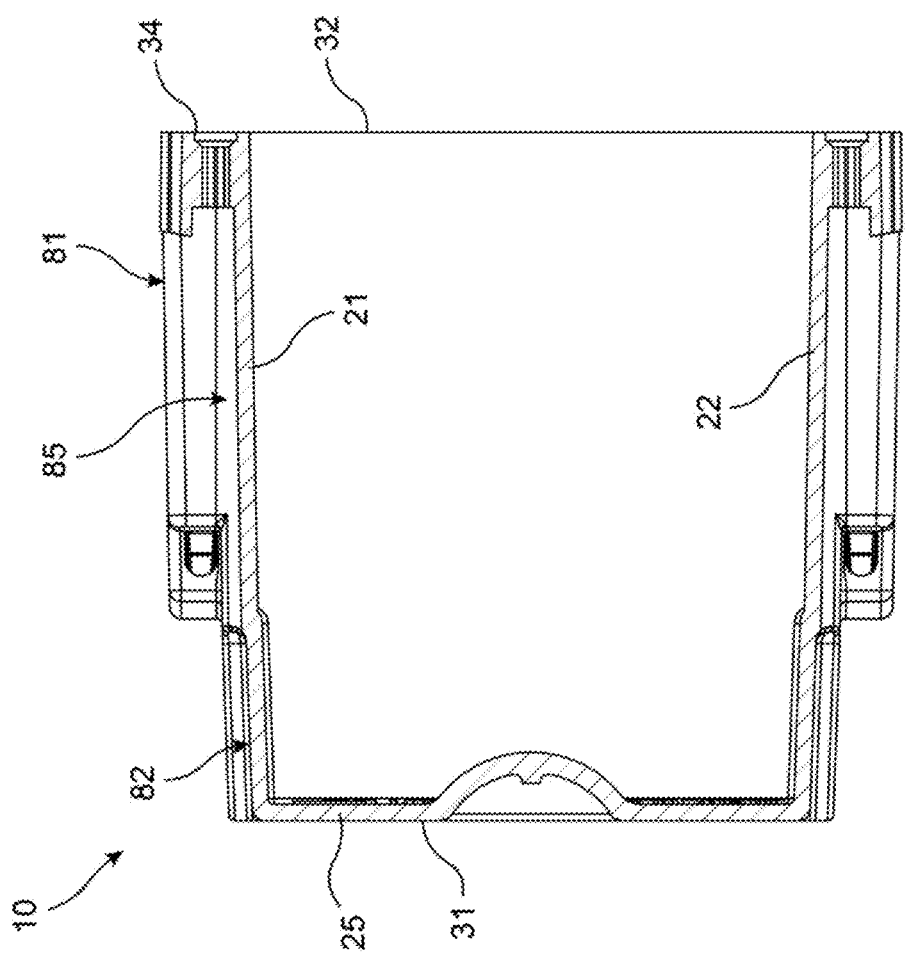
FIG. 5 is a cross-sectional elevational view of the electrical box taken from the perspective of section lines 5-5 of FIG. 3.
Figure 4:
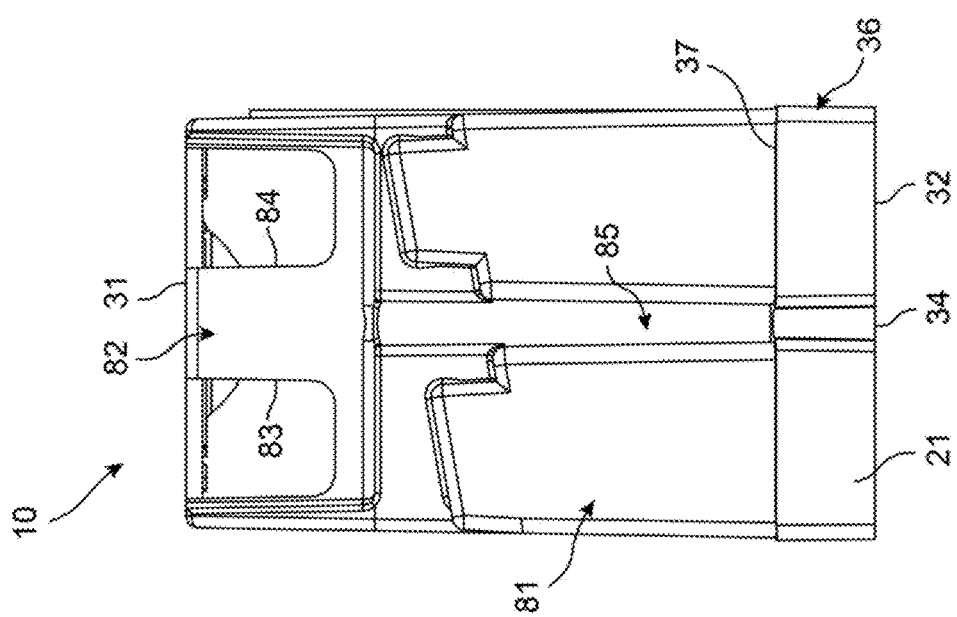
FIG. 4 is a top plan view of the electrical box of FIG. 3.
Figure 6:
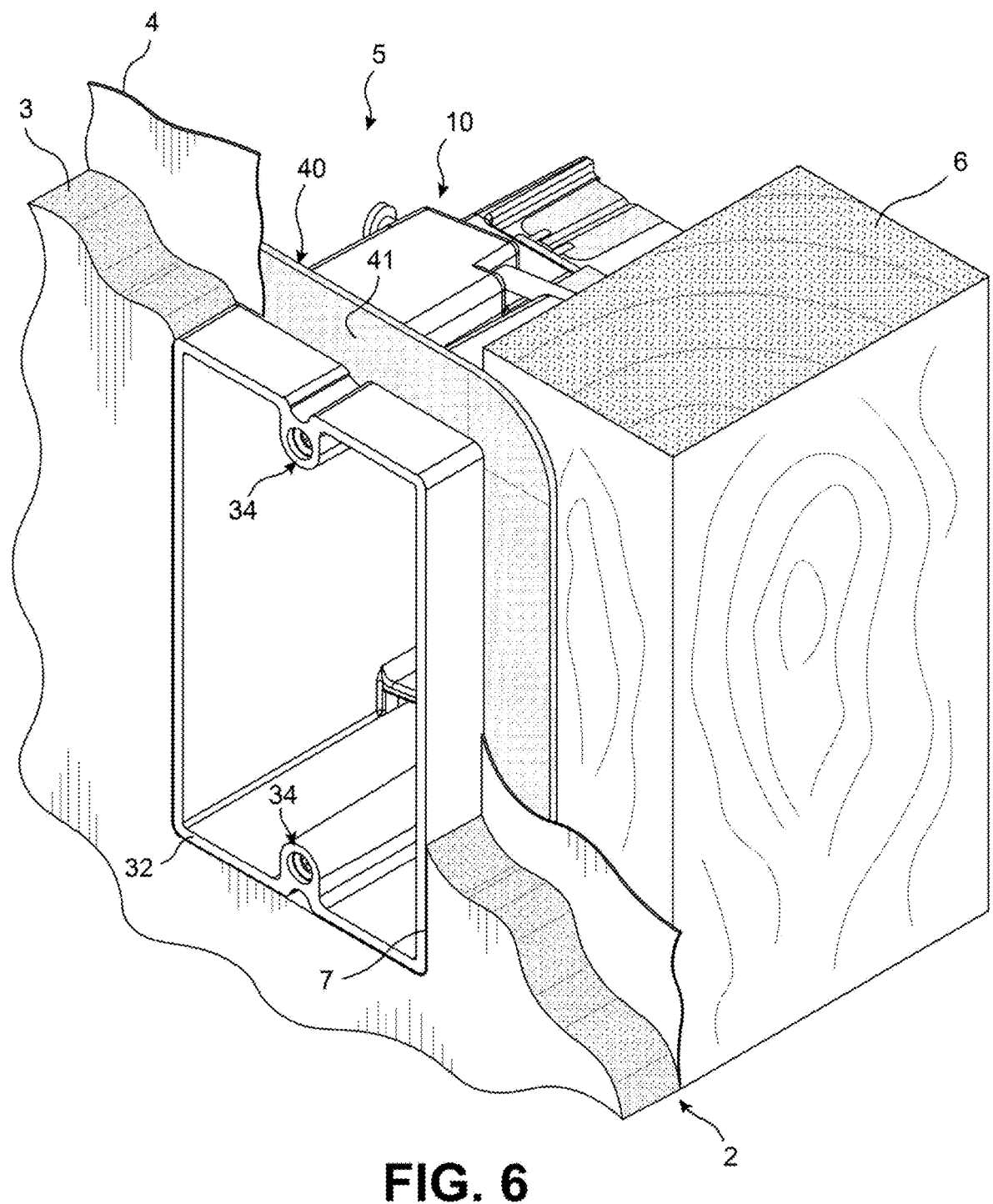
FIG. 6 is a fragmentary perspective view of a wall structure having the electrical box assembly of FIG. 1 installed therein.

FIGS. 1, 2, and 6 illustrate an electrical box assembly 5 including an electrical box 10 having a molding 11 applied thereto according to an embodiment of the present invention. FIGS. 3-5 illustrate the electrical box 10 in isolation prior to the formation of the molding 11, and are accordingly referred to hereinafter when referencing the method of formation of the finalized electrical box assembly 5.

The electrical box assembly 5 is configured for reception within a wall structure, such as a vertically wall defining an interior surface of a room, a vertically extending wall forming an exterior surface of a building or similar structure, a horizontally extending ceiling structure, a horizontally extending floor structure, or the like. One skilled in the art should understand that the disclosed electrical box assembly 5 may be configured for reception in essentially any planar dividing structure arranged at any orientation while remaining within the scope of the present invention. For simplicity and brevity, the wall structure is described hereinafter with reference to an exemplary installation within a vertically extending wall structure forming an interior surface of a room.

For example, FIG. 6 illustrates one exemplary wall structure 2 for use with the electrical box assembly 5. The wall structure 2 includes a layer of drywall 3 facing towards an interior of the associated room formed by the wall structure 2, a vapor barrier 4 disposed adjacent and inwardly of the drywall 3 with respect to the wall structure 2, and at least one vertically extending stud 6 disposed inwardly of the vapor barrier 4 and configured to support the electrical box assembly 5 when in the installed position. The disclosed drywall 3 may be replaced with any rigid structure, panel, or substrate, as desired, and may include multiple layers of the rigid structures without departing from the scope of the present invention. The vapor barrier 4 may be formed from a thermally insulating, relatively thin, and substantially flexible material capable of preventing the passage of air of other fluids therethrough. The stud 6 forms a surface extending transversely from the drywall 3 configured for coupling to the electrical box assembly 5, as explained in greater detail hereinafter.

The drywall 3 and the vapor barrier 4 may be penetrated to form an opening 7 through the wall structure 2 having a perimeter shape corresponding to that of the electrical box 10 of the electrical box assembly 5. In the present embodiment, the resulting opening 7 is substantially rectangular in shape to correspond to the substantially rectangular perimeter shape of the electrical box 10, but one skilled in the art should appreciate that the electrical box 10 and the resulting opening 7 formed in the wall structure 2 may take on any corresponding closed perimeter shape without necessarily departing from the scope of the present invention, such as a circular shape, a square shape, a hexagonal shape, or the like, depending on the shape and configuration of the corresponding electrical box. The opening 7 may be positioned immediately adjacent the aforementioned coupling surface of the stud 6, as desired. One skilled in the art will appreciate that the electrical box assembly 5 may be configured for use with alternative building structure configurations while remaining within the scope of the present invention, as desired.

The electrical box 10 includes a plurality of sidewalls 21, 22, 23, 24 cooperating to form the rectangular perimeter shape thereof. More specifically, the sidewalls 21, 22, 23, 24 include a first sidewall 21 forming an upper portion of the electrical box 10 (when in the installed position of FIG. 6), a second sidewall 22 forming a lower portion of the electrical box 10 opposite the first sidewall 21, a third sidewall 23 connecting the first and second sidewalls 21, 22 at one lateral side of the electrical box 10, and a fourth sidewall 24 connecting the first and second sidewalls 21, 22 at the other lateral side of the electrical box 10 opposite the third sidewall 23. All of the sidewalls 21 22, 23, 24 include a substantially equal depth as the sidewalls 21, 22, 23, 24 extend from a closed end 31 to an opening end 32 of the electrical box 10. The closed end 31 of the electrical box 10 is formed by an end wall 25 of the electrical box 10 intersecting an inner end of each of the sidewalls 21, 22, 23, 24 while the open end 32 of the electrical box 10 is formed by the cooperation of the outer end of each of the sidewalls 21, 22, 23, 24. The third and fourth sidewalls 23, 24 are shown throughout as having a greater dimension in the vertical direction than do the first and second sidewalls 21, 22 in the horizontal direction, but any configuration of the sidewalls 21, 22, 23, 24 may be used without necessarily departing from the scope of the present invention. The open end 32 of the electrical box 10 is configured to be positioned substantially co-planar with an outwardly facing surface of the drywall 3 while the closed end 31 of the electrical box 10 is disposed within an interior of the wall structure 2 when the electrical box assembly 5 is in the installed position as shown in FIG. 6.

The sidewalls 21, 22, 23, 24 of the electrical box 10 further form a collar 36 about the open end 32 of the electrical box 10. The collar 36 extends rearwardly until terminating at an outwardly extending surface 37 connecting the outer surface of the collar 36 to the rearwardly extending portions of the sidewalls 21, 22, 23, 24. The illustrated electrical box 10 is a single gang rectangular box having opposing bosses 34 formed within the collar 36 at each of the first sidewall 21 and the second sidewall 22, wherein each of the bosses 34 is provided to extend into the electrical box 10 to provide connection for an electrical appliance mounted in the electrical box 10. However, other box configurations can be used such as a two gang box, a three gang box, a four gang box, and the like without departing from the scope of the present invention.

In the illustrated embodiment, the first sidewall 21 and the second sidewall 22 each include similar structure that is substantially mirrored about a horizontally extending plane, hence discussion is limited exclusively to the form and configuration of the features found on the first sidewall 21. The first sidewall 21 includes a first portion 81 having substantially the same cross-section as the open end 32 of the electrical box 10 and a second portion 82 indented inwardly from the first portion 81 with respect to the vertical direction from the perspective of FIGS. 1 and 3, wherein the first portion 81 and the second portion 82 are disposed on substantially parallel arranged and horizontally extending planes. The second portion 82 includes a first window 83 and a second window 84 formed therein, wherein each of the windows 83, 84 forms an opening providing access to an interior of the electrical box 10 from an exterior of the electrical box 10. The windows 83, 84 are shown as being formed at an intersection of the first sidewall 21 with the end wall 25 and are spaced apart from each other with respect to a width direction of the electrical box 10 extending between the opposing third and fourth sidewalls 23, 24. The first portion 81 includes a central channel 85 formed therein extending from the outwardly extending surface 37 of the collar 36 to the second portion 82 of the first sidewall 21. As best shown in FIG. 5, which illustrates a cross-sectional view through the central channel 85 of the first portion 81, a base of the channel 85 is arranged substantially co-planar with the plane defined by the outer surface of the second portion 82 of the first sidewall 21, which aids in the formation of the molding 11 by providing a substantially linear path for the molding material when flowing from the closed end 31 of the electrical box 10 towards the open end 32 thereof. The first portion 81 of the first sidewall 21 further includes a coupling feature 90 configured for coupling the electrical box assembly 5 to a structure such as one of the studs 6 as illustrated in FIG. 6. In the provided embodiment, the coupling feature 90 is formed by a fastener 91 extending laterally through openings 92 formed through the first portion 81 of the first sidewall 21. The fastener 91 may be a nail, a threaded screw or bolt, or the like, as desired. One skilled in the art should appreciate that any suitable type of coupling feature may be utilized for mounting the electrical box assembly 10 to the associated wall structure without departing from the scope of the present invention, including adhesives, tapes, clamping mechanisms, swing gates, or the like.

The electrical box 10 may be formed from a substantially rigid material capable of being formed into the shape and configuration disclosed in FIGS. 3-5. The rigid material may be any of a number of moldable thermoplastic including PVC, polycarbonate, polyphenylene oxide, or fiberglass reinforced polyester, as non-limiting examples. Other rigid materials may be utilized for forming the electrical box 10 without departing from the scope of the present invention.

The molding 11 generally includes a vapor barrier flange 40 (hereinafter "the flange"), at least one knock out 50, and at least one connecting portion 60 extending between the flange 40 and the at least one knock out 50. As explained in greater detail hereinafter, the molding 11 may be formed as part of a 2-shot molding process performed when manufacturing the electrical box assembly 5. In the provided embodiment, the molding 11 includes the vapor barrier flange 40, a first pair of the knock outs 50 disposed in the first sidewall 21, a second pair of the knock outs 50 disposed in the second sidewall 22, a first one of the connecting portions 60 connecting the first pair of the knock outs 50 to the flange 40, and a second one of the connecting portions 60 connecting the second pair of the knock outs 50 to the flange 40. It should be apparent to one skilled in the art that alternative combinations of the disclosed features may be formed within the electrical box 10 at additional or contrary positions without departing from the scope of the present invention, so long as the resulting structure is suitable for formation in the disclosed 2-shot molding process while maintaining the beneficial aspects of each of the features described hereinafter.

The flange 40 is resiliently flexible and self-supporting. The term "self-supporting" as used herein means when the electrical box 10 is secured to a wall structure with the open end 32 thereof towards the interior of the corresponding room the flange 40 supports the weight of the electrical box 10. The term "resiliently flexible" as used herein means when the flange 40 is bent and released, the flange 40 will return to the position shown in FIG. 1 when exposed to room temperature. The flange 40 may accordingly be formed from a suitable resiliently flexible polymeric material, such as an elastomeric material, as desired. The polymeric materials used to form the molding 11 (and hence the flange 40) may include polyesters, polyurethanes, polyethers, polyamides, polyimides, polycarbonates, polyvinylchloride, and combinations thereof.

The flange 40 includes a first surface 41 facing towards the open end 32 of the electrical box 10, an oppositely arranged second surface 42 facing towards the closed end 31 of the electrical box 10, a rim 43 connecting the first surface 41 to the second surface 42 about an outer periphery of the flange 40, and an inner surface 44 contacting an outer surface of each of the sidewalls 21, 22, 23, 24 of the electrical box 10 while also connecting the first surface 41 to the second surface 42 opposite the rim 43. The flange 40 extends laterally outwardly from the sidewalls 21, 22, 23, 24 of the electrical box 10 at a position disposed intermediate the open end 32 and the closed end 31 thereof. The flange 40 may be spaced from the open end 32 of electrical box 10 by a distance suitable for accommodating the thickness of the adjacent wall structure such as the layer of drywall 3 as disclosed in FIG. 6. The inner surface 44 of the flange 40 may be positioned to abut the portion of each of the sidewalls 21, 22, 23, 24 intersecting the collar 36 of the electrical box 10 to cause the first surface 41 of the flange 40 to be in abutment with the outwardly extending surface 37 defining an inner end of the collar 36. The collar 36 of the electrical box 10 may accordingly be provided to have an axial length in the depth direction of the electrical box 10 that is substantially equal to the thickness of the layer of drywall 3. For conventional drywall constructions, this distance may be about 7/16 of an inch, as one non-limiting example.

The inner surface 44 of the flange 40 forms a fluid tight seal with the outer surface of each of the sidewalls 21, 22, 23, 24 when disposed thereon for preventing the passage of air or other fluids between the inner surface 44 of the flange 40 and the outer surface of each of the sidewalls 21, 22, 23, 24. As can best be seen in FIG. 2, the flange 40 may include a forward incline in a direction towards the open end 32 of the electrical box 10 such that the rim 43 of the flange 40 is spaced from the inner surface 44 of the flange 40 with respect to the depth direction of the electrical box 10 extending between the closed and open ends 31, 32 thereof. The flange 40 may accordingly be described as having a slight axial taper as the flange 40 projects outwardly away from the outer surface of the electrical box 10. The forward incline of the flange 40 may result in the first and second surfaces 41, 42 including planar portions along each of the sidewalls 21, 22, 23, 24 and curved portions connecting each of the non-parallel planar portions at the corners of the flange 40 to maintain the desired perimeter shape of the flange 40, which is rounded rectangular in the present embodiment. The flange 40 may be inclined at an acute angle relative to the plane defined by the open end 32 of the electrical box 10. The acute angle may be 10 degrees, as one non-limiting example.

The flange 40 extends outwardly from the periphery of the electrical box 10 in the vertical and lateral directions by a suitable distance for forming an adequate seal with the adjacent surfaces of the wall structure 2. The flange 40 may project about ⅝ of an inch from the outer surface of the corresponding sidewall 21, 22, 23, 24 to ensure that the seal is established about an entirety of the periphery of the electrical box 10, as one non-limiting example.

The first pair of the knock outs 50 includes one of the knock outs 50 disposed within the first window 83 of the second portion 82 of the first sidewall 21 and another one of the knock outs 50 disposed within the second window 84 of the second portion 82 of the first sidewall 21. Each of the knock outs 50 may include a slit 51 formed therein. Each of the slits 51 is configured to receive an electrical cord or a cable therethrough to permit the cord or the cable to pass through to an interior of the electrical box 10. A resiliency of the material forming each of the knock outs 50 also causes each of the slits 51 to attempt to return to the original closed position following insertion of the cord or cable, thereby reducing a cross-section of a flow path formed between the surfaces of each of the knock outs 50 defining one of the slits 51 and the outer surface of the corresponding cord or cable. The resiliency of each of the knock outs 50 further leads to the slits 51 returning to the closed position following the removal of the cord or cable. The resilient closing of each of the slit 51 accordingly facilitates the maintaining of optimum air tight conditions with respect to the electrical box assembly 5. Each of the slits 51 may be formed at the base of a V-shaped indentation formed in one of the knock outs 50 to further facilitate entry of the cord or cable and then separation of the opposing portions of the knock out 50 formed to either side of the corresponding slit 51.

In other embodiments, the knock outs 50 may be provided without the inclusion of the slits 51 formed therethrough, and may instead be provided with features (not shown) configured to aid in the formation of one of the slits 51 immediately prior to the introduction of the corresponding cord or cable. For example, the outer surface of each of the knock outs 50 may include any series of indentations, perforations, or the like for prescribing a desired shape and position of whatever opening is formed through the corresponding knock out 50 when attempting to access the interior of the electrical box 10. For example, each of the knock outs 50 may be provided with the aforementioned V-shaped indentation with the indentation not fully penetrating the corresponding knock out 50, thereby requiring an operator to pierce the corresponding knock out 50 along the indentation to form the desired slit. The elastomeric material forming each of the knock outs 50 resiliently attempts to return to an original configuration thereof regardless of the method of formation of the slit through each of the knock outs 50.

The connecting portion 60 associated with the first sidewall 21 connects each of the first pair of the knock outs 50 with the portion of the flange 40 extending outwardly from the first sidewall 21. The connecting portion 60 includes a longitudinal member 61 extending in the depth direction of the electrical box 10 and a cross member 62 extending in the width direction of the electrical box 10. The longitudinal member 61 extends primarily within the central channel 85 of the first sidewall 21 before merging into the cross member 62 along a region of the second portion 82 of the first sidewall 21 having the windows 83, 84 formed therein. The longitudinal member 61 may include a runner portion 63 representing a portion of the molding 11 through which molding material is introduced to the remainder of the associated mold. The runner portion 63 may extend to the end wall 25 of the electrical box 10 to allow for the molding material to be introduced into the corresponding mold at both the first sidewall 21 and the second sidewall 22 simultaneously. The cross member 62 extends laterally from the longitudinal member 61 towards an end of the slit 51 formed in each of the knock outs 50 provided within the first sidewall 21. A pair of links 64 couple each of the knock outs 50 to one of the laterally extending legs of the cross member 62 to either side of the longitudinal member 61. Each pair of the links 64 straddles the slit 51 formed in the corresponding one of the knock outs 50. The links 64 may be provided to prevent removal or separation of the knock outs 50 from the corresponding windows 83, 84 during a separation of the opposing portions of the knock outs 50 formed to either side of one of the slits 51.

The electrical box assembly 5 may be manufactured by employing a 2-shot molding process. The first shot of the molding process includes the formation of a substantially rigid electrical box 10 (at room temperature) while the second shot of the molding process includes the formation of the resiliently flexible molding 11 on an outer surface of the recently molded electrical box 10. A first mold (not shown) is provided having the form and configuration suitable for forming the electrical box 10 as shown in FIGS. 3-5, wherein the first mold is filled in conventional fashion with one of the materials described as being suitable for forming the electrical box 10 hereinabove.

Once the electrical box 10 is suitably formed and solidified using the conventional process, the electrical box 10 is repositioned relative to a second mold (not shown) for exposing an outer surface of the electrical box 10 to the molding material used to form the molding 11 onto the electrical box 10. The segments forming the second mold close around the exterior of the electrical box 10 while forming voids around the outer surface of the electrical box 10 corresponding in shape and configuration to the different portions of the molding 11 as shown and described herein. As mentioned previously, the material forming the molding 11 may be injected into the second mold through the portion of the second mold corresponding to the runner portion 63 of each of the longitudinal members 61. The molding material may also be introduced into the second mold at each of the windows 83, 84 by virtue of the windows 83, 84 extending to the end wall 25, as desired. The material forming the molding 11 may accordingly flow towards the open end 32 of the electrical box 10 after entering the second mold at positions adjacent each of the first sidewall 21 and the second sidewall 22, thereby forming each of the features of the molding 11 shown and described herein.

In operation, the electrical box assembly 5 is secured to the corresponding wall structure 2 and is used to enclose electrical devices and their connections to the electrical circuit of the associated building. As shown in FIG. 6, the electrical box assembly 5 is secured to a stud 6 by means of the coupling feature 90. More specifically, the fastener 91 penetrates the stud 6 with one of the sidewalls 23, 24 placed in abutment with a surface of the stud 6 arranged perpendicular to the open end 32 of the electrical box 10. The flange 40 is positioned wherein the first surface 41 thereof is facing towards and abutting an inwardly facing surface of the vapor barrier 4 about a periphery of the opening 7 formed through the drywall 3 and the vapor barrier 4. In the event that a vapor barrier 4 is not utilized in the wall structure 2, the first surface 41 of the flange 40 may instead be positioned to face towards and directly abut an inwardly facing surface of the layer of drywall 3, as desired. In either event, the abutment of the flange 40 with a surface of the wall structure 2 surrounding a periphery of the opening 7 provides for the formation of an air-tight seal around a periphery of the electrical box 10 when in the position shown in FIG. 6. In some embodiments, an adhesive (not shown) or double-sided tape (not shown) may be applied to the first surface 41 of the flange 40 immediately prior to installation of the electrical box assembly 5 to further secure the flange 40 against the inwardly facing surface of the drywall 3 or the vapor barrier 4, thereby ensuring that the air-tight seal is maintained following installation of the electrical box assembly 5.

The inclination of the flange 40 towards the open end 32 of the electrical box 10 also aids in maintaining the air-tight seal around the periphery of the electrical box 10 by means of the resilient flexibility of the material forming the flange 40. Specifically, the installation of the electrical box assembly 5 to a position wherein the open end 32 of the electrical box 10 is flush with an outwardly facing surface of the layer of drywall 3 may include the flange 40 being flexed from the forwardly inclined position to a position wherein the first surface 41 and the second surface 42 of the flange 40 are arranged substantially parallel to the open end 32 of the electrical box 10. The resiliency of the flange 40 causes the flange 40 to attempt to return to the forwardly inclined pre-installed position, which in turn causes the first surface 41 of the flange 40 to apply a force to the inwardly facing surface of the wall structure 2. The resilient force accordingly biases the flange 40 towards the described sealing configuration in the absence of intervening components such as additional fasteners or the like.

Although the flange 40 has been described as potentially contacting an inwardly facing surface of the vapor barrier 4, the flange 40 may instead be positioned between the inwardly facing surface of the layer of drywall 3 and an outwardly facing surface of the vapor barrier 4, as desired. The appropriate surfaces of the flange 40 may include the aforementioned adhesive or double-sided tape for establishing a stronger connection between the flange 40 and whatever surfaces are placed in abutment therewith. The flange 40 may also be placed in abutment with alternative features of the wall structure 2 while maintaining the same relationships discussed generally herein, such as being placed in direct contact with a surface of the stud 6 or another adjacent structural element, as desired.

Although the electrical box 10 is shown as having a rectangular peripheral shape, it should be understood by one skilled in the art that the general concepts of the present invention may be easily adapted to alternative peripheral shapes without departing from the scope of the present invention. For example, a cylindrical electrical box may include a circular flange projecting outwardly from an outer circumferential surface of the electrical box while the knock outs may be formed at desired locations on the outer circumferential surface adjacent and rearward of the flange, such as at diametrically opposed portions of the outer circumferential surface for forming the same general configuration of the connecting portions and knock outs as is disclosed in the embodiment of FIG. 1.

The present invention provides a new and improved electrical box that allows such a box to be installed in a wall structure while maintaining the integrity of the wall structure. The new and improved electrical box also has a resiliently flexible flange which can be mounted to maintain the integrity of a vapor barrier in an exterior wall or ceiling of a building structure, but that can also accommodate any small inconsistencies in dimensions, alignment and the like, so as to allow for fast and efficient construction while at the same time maintaining planar interior wall surfaces and desired exterior siding constructions.

The present invention also provides a new and improved electrical box that has a plurality of knock outs that are over molded with the same material used in forming the flange. The knock outs are also slit or prepared for subsequent cutting, making it possible for cables to pass through the knock outs to facilitate electrical connections within the box while retaining these cables at the same time. The knock outs also close to reform its originally undisturbed position once these cables are removed, maintaining optimum air tight conditions.

The formation of multiple different resilient features in a single manufacturing step also greatly simplifies the formation of the electrical box assembly while simultaneously providing each of the beneficial features described herein.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box assembly comprising:
   a box structure including a closed end, an oppositely arranged open end, and an interior surrounded by at least one sidewall connecting the open end to the closed end;
   a flange extending outwardly from an outer surface of the at least one sidewall at a position intermediate the open end and the closed end of the box structure, the flange formed from a resiliently flexible material, and
   at least one knock out disposed within an opening formed in one of the at least one sidewall or the closed end of the box structure, the at least one knock out formed from the same material as the flange, wherein the at least one knock out and the flange are formed as a unitary structure.

2. The electrical box assembly according to claim 1, wherein the unitary structure is formed in an overmolding process performed on the box structure.

3. The electrical box assembly according to claim 1, wherein the unitary structure further comprises at least one connecting portion extending between and connecting the flange to the at least one knock out.

4. The electrical box assembly according to claim 3, wherein the connecting portion is disposed within an indented portion of the outer surface of the at least one sidewall.

5. The electrical box assembly according to claim 1, wherein the flange includes a first surface facing towards the open end of the box structure and an opposing second surface facing towards the closed end of the box structure.

6. The electrical box assembly according to claim 5, wherein the first surface and the second surface of the flange are arranged transversely relative to an axial direction of the box structure extending in a direction from the open end to the closed end of the box structure.

7. The electrical box assembly according to claim 6, wherein the first surface and the second surface are inclined relative to the axial direction of the box structure.

8. The electrical box assembly according to claim 7, wherein the first surface and the second surface are inclined towards the open end of the box structure as the flange extends away from the outer surface of the at least one sidewall.

9. The electrical box assembly according to claim 1, wherein the flange has a perimeter shape corresponding to a perimeter shape of the box structure.

10. The electrical box assembly according to claim 1, wherein the flange is spaced from the open end of the box structure to accommodate a thickness of an associated wall structure between the open end and the flange.

11. The electrical box assembly according to claim 10, wherein the flange abuts a collar surrounding the open end of the box structure.

12. A method of manufacturing an electrical box assembly comprising the steps of:
- molding a box structure in a first shot of a molding process, the box structure including a closed end, an oppositely arranged open end, and an interior surrounded by at least one sidewall connecting the open end to the closed end;
- molding a flange onto the box structure in a second shot of the molding process, the flange extending outwardly from an outer surface of the at least one sidewall at a position intermediate the open end and the closed end of the box structure.

13. The method according to claim 12, wherein the first shot of the molding process includes a first material and the second shot of the molding process includes a second material different from the first material.

14. The method according to claim 13, wherein the first material is rigid at room temperature and the second material is resiliently flexible at room temperature.

15. The method according to claim 13, wherein the second material is introduced into a mold at a position adjacent the closed end of the box structure.

16. The method according to claim 12, further comprising the step of molding of at least one knock out into an opening of the electrical box during the second shot of the molding process.

17. The method according to claim 16, wherein the at least one knock out and the flange form a portion of a unitary structure.

18. The method according to claim 16, wherein a connecting portion connects the at least one knock out to the flange.

19. An electrical box assembly comprising:
- a box structure including a closed end, an oppositely arranged open end, and an interior surrounded by at least one sidewall connecting the open end to the closed end;
- a flange extending outwardly from an outer surface of the at least one sidewall at a position intermediate the open end and the closed end of the box structure, the flange formed from a resiliently flexible material, wherein the flange includes a first surface facing towards the open end of the box structure and an opposing second surface facing towards the closed end of the box structure, wherein the first surface and the second surface of the flange are arranged transversely relative to an axial direction of the box structure extending in a direction from the open end to the closed end of the box structure, and wherein the first surface and the second surface are inclined relative to the axial direction of the box structure.

20. The electrical box assembly according to claim 19, wherein the first surface and the second surface are inclined towards the open end of the box structure as the flange extends away from the outer surface of the at least one sidewall.

* * * * *